US005541357A

United States Patent [19]

Sato et al.

[11] Patent Number: 5,541,357

[45] Date of Patent: Jul. 30, 1996

[54] ELECTRONIC INSTRUMENT FOR SYNTHESIZING SOUND BASED ON WAVEFORMS OF DIFFERENT FREQUENCIES

[75] Inventors: Hiroshi Sato; Gen Izumisawa; Jiro Tanaka; Kiyomichi Kushimiya, all of Hamamatsu, Japan

[73] Assignee: Kabushiki Kaisha Kawai Gakki Seisakusho, Hamamatsu, Japan

[21] Appl. No.: 252,769

[22] Filed: Jun. 2, 1994

[30] Foreign Application Priority Data

Jun. 3, 1993 [JP] Japan .................................... 5-133661

[51] Int. Cl.$^{6}$ ................................ G01P 3/00; G10H 1/02

[52] U.S. Cl. ................................................ 84/626; 84/604

[58] Field of Search ...................... 84/603–605, 625–627

[56] References Cited

U.S. PATENT DOCUMENTS 4,779,505 10/1988 Suzuki ...................................... 84/622
4,893,538 1/1990 Masaki et al. ............................ 84/622

*Primary Examiner*—William M. Shoop, Jr.
*Assistant Examiner*—Jeffrey W. Donels
*Attorney, Agent, or Firm*—Davis, Bujold & Streck, P.A.

[57] ABSTRACT

In the sound source system, the waveform sampled from the sounds of keys pressed down with two or more kinds of intensity are synthesized in a specified rate, thereby forming the waveform of the sounds of keys pressed down with the other kind of intensity. Thus, almost the actual instrumental deep sounds can be reproduced. The sound waveform sampled from weak key presses is passed through a low pass filter, and the filtered waveform composed only of low order harmonic components is transformed to weak press data in the pulse code modulation system for the storage. Similarly, the sound waveform sampled from strong key presses are passed through a high pass filter, thereby removing the low order harmonic components. The filtered waveform composed only of the high order harmonic components are transformed to strong press data in the pulse code modulation system for the storage. The high pass filter can remove the frequency components which pass through the low pass filter. By mixing the weak and strong press data in the rate determined by the key press intensity, the sound waveform signal of optional key press intensity is formed.

7 Claims, 8 Drawing Sheets

ELECTRONIC INSTRUMENT FOR SYNTHESIZING SOUND BASED ON WAVEFORMS OF DIFFERENT FREQUENCIES

FIELD OF THE INVENTION

The invention relates to an electronic instrument which reproduces instrumental sounds based on the data obtained by sampling sounds from actual musical instruments and processing the sampled sounds in the pulse code modulation sound source system or other system.

BACKGROUND OF THE INVENTION

Recently, to reproduce the instrumental sounds of high quality in an electronic piano, actual instrumental sounds were sampled and stored in a memory as pulse code modulation waveform data, and the data was read from the memory for the reproduction of the instrumental sounds. When the pulse code modulation waveform data was stored in the memory for all the keys and all the key press intensities of the electronic piano, however, the voluminous memory was required.

To reduce the memory capacity, in a conventional electronic instrument sound source system, as shown in FIG. 7, only the pulse code modulation waveform of strong key presses is sampled. To obtain the waveform of weak key presses, the sampled waveform of the strong key press is transformed via a low pass filter into the waveform only of low order harmonic components. The pulse code modulation waveform of strong key presses and the filtered waveform composed of weak key press components are mixed in a specified rate, thereby forming the waveform of moderate key presses.

Actual strong and weak presses on piano keys differ from each other in the kind of harmonic components, and also in the relative content rate of reference and harmonic sound components. In the conventional sound source system, the relation between the reference and harmonic sound components in the weak key press data is only the same as that in the strong key press data. The relation subtlely varying with key press intensities as in the actual piano sounds is unobtainable. Just the monotonous relation can be provided.

To obtain the relation variable with the key press intensities between the reference and harmonic sound components, the pulse code modulation waveform at least of weak and strong key presses are sampled. By synthesizing the sampled waveforms in a specified rate, in the conventional sound source system, as shown in FIG. 8, the waveform of instrumental sounds of moderately pressed keys is formed. This sound source system, however, has following disadvantages.

As aforementioned, strong key press differs from weak key press in the kind of harmonic components, as well as in the relative content ration of the reference and harmonic sound components. Furthermore, the strong key press slightly differs from the weak key press in the phase of waveform. When the waveforms different from each other in the phase are synthesized, the phase interference arises, thereby forming the waveform different from the waveform, shown by dotted lines in FIG. 8 of the sounds to be reproduced of the actually moderately pressed keys. In the formed waveform, the level of harmonic components is changed because of the phase interference.

As aforementioned, when the strong and weak key press waveform data is based on the same sampled waveform, only monotonous and shallow sounds are reproduced. When the strong and weak key press waveforms are individually sampled, however, the instrumental sounds excessively different in balance from the actual instrumental sounds are reproduced.

SUMMARY OF THE INVENTION

Wherefore, an object of this invention is to provide an electronic instrument having the sound source system in which by synthesizing in a specified rate the sound waveforms of at least two kinds of key press intensities, the sound waveform of the key press intensities other than those of the synthesized waveforms is formed, for reproducing almost actual instrumental deep sounds.

To attain this or other object, the invention provides an electronic instrument provided with a sampled waveform memory for storing the sampling results of sound waveforms and a sound waveform forming unit. In the sound waveform forming unit, the data is read from the sampled waveform memory based on the sound pitch, key press intensity and other information of the sounds to be reproduced and instrumental sound waveforms are electronically formed. The sampled waveform memory is at least provided with a first waveform memory and a second waveform memory. After the sound waveforms of the keys pressed down with a first intensity are sampled, first components are selected and stored in the first waveform memory. The first components are in a specified range of frequencies. After the sound waveforms of the keys pressed down with a second intensity are sampled, second components are stored in the second waveform memory. The second components fail to interfere with the first components stored in the first waveform memory. By the sound waveform forming unit, the first and second components are read from the first and second waveform memory, respectively, based on the sound pitch, key press intensity or other information of the sounds to be reproduced, and are synthesized in a specified ratio, thereby forming the instrumental sound waveforms.

Since the second components stored in the second waveform memory fail to interfere with the first components stored in the first waveform memory, even if the sampled waveform data of the keys pressed with the first intensity differ in phase from those of the keys pressed with the second intensity, no phase interference arises, and no strange sounds is made. Specifically, phase interference components are excluded from the components stored in the first and second waveform memory. Therefore, even if the sampled waveform data of the keys pressed with the first and second intensities differ from each other in phase, the components read from the first and second waveform memory can by synthesized to form the instrumental sound waveforms without being influenced by the phase interference.

Since the synthesized instrumental sound waveforms are based on the sampled sound waveforms of the keys pressed with the first and second key press intensities, the subtle variations in tones corresponding to the actual key press intensities can be reproduced. The frequency component content rate in the instrumental sound waveforms also vary subtlely with key press intensities. Such various and deep instrumental sound waveforms can be synthesized.

When the almost actual and deep instrumental sounds are reproduced, especially, the sound waveforms of weakly pressed keys are sampled, and only the low order harmonic components of the sampled sound waveforms are stored in the first waveform memory. On the other hand, the sound waveforms of strongly pressed keys are sampled, and only the high order harmonic components of the sampled sound waveforms are stored in the second waveform memory.

The instrumental sounds of weakly pressed keys are mainly composed of low order harmonic components. Therefore, by synthesizing these main components with the high order harmonic components stored in the second waveform memory, the tone close to that of rather soft instrumental sounds can be reproduced.

The rather soft instrumental sounds mainly contain low order harmonic components. Since the low order harmonic components are based on the campling results from the performance played with a weak intensity, the rate of the low order harmonic components in the synthesized instrumental sound waveforms is equivalent to the relative rate of low order harmonic components contained in the instrumental soft sounds. Consequently, the subtlely varying tones of rather soft sounds can be reproduced.

Rather loud instrumental sounds contain both the low and high order harmonic components. Therefore, the content rate of these components can be set 5:5, 6:4 or other in the first and second waveform memory. The relative rate of the low order harmonic components deviates from that in the actual rather loud instrumental sounds. The actual rather loud instrumental sounds, however, also contain a large amount of high order harmonic components. Therefore, the deviation in the relative content rates of low order harmonic components is lessened, influenced by the high order harmonic components. Consequently, the reproduction of rather loud instrumental sounds can provide a reality.

Rather soft sounds are characterized mainly by the content of low order harmonic components and rather loud sounds are characterized mainly by the content of high order harmonic components. The instrumental sounds are thus influenced by key press intensities. The range of frequencies of the components to be stored in the first and second waveform memory is set appropriately, such that the characteristics of sounds can be reproduced based on the data sampled from actual instruments.

BRIEF DESCRIPTION OF THE DRAWINGS

The invention will now be described, by way of example, with reference to the drawings, in which.

DETAILED DESCRIPTION OF THE PREFERRED EMBODIMENTS

Figure 1:
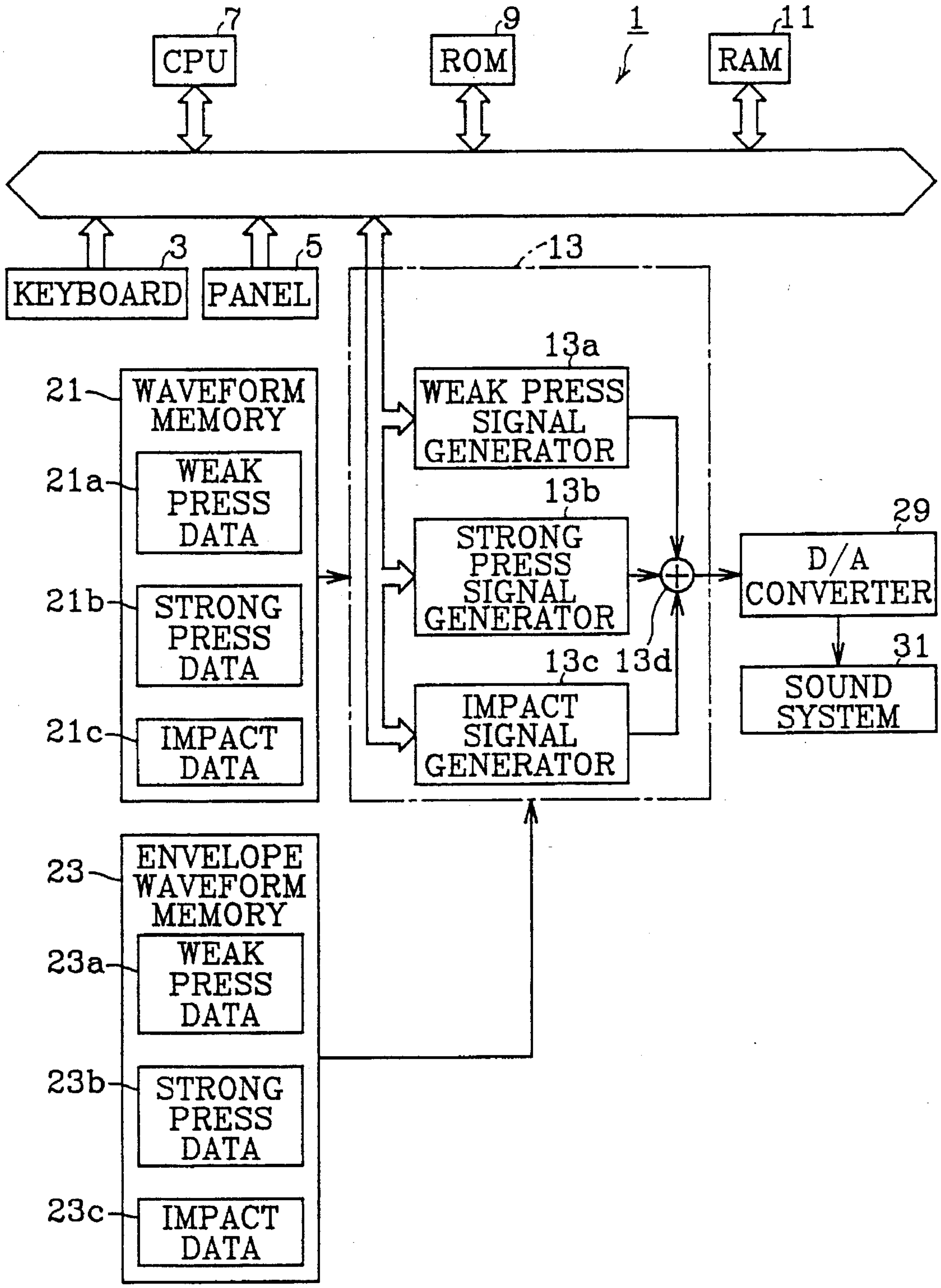
FIG. 1 is a block diagram showing the structure of an electronic piano embodying the invention.

As shown in FIG. 1, an electronic piano 1 is provided with a keyboard 3, a panel 5, CPU 7, ROM 9, RAM 11 and a sound signal generator 13. These components are interconnected via a system bus. The keyboard 3 has 88 keys equivalent to acoustic piano keys and a touch sensor for detecting key press, key release and key press intensity. The panel 5 is provided with an electric power switch, a mode designating switch and other switches. The signals from the keyboard 3 and the panel 5 are received and processed by the CPU 7. The ROM 9 has a program memory and a tone data memory to allow the CPU 7 to conduct various control processes. The RAM 11 is used when assignor or other processes are executed in the CPU 7. The sound signal generator 13 generates sound signals in response to the instructions from the CPU 7. The sound signal generator 13 is connected to a waveform memory 21 and an envelope waveform memory 23.

The waveform memory 21 is composed of weak press data memory 21*a*, strong press data memory 21*b* and impact data memory 21*c*.

Figure 2A:
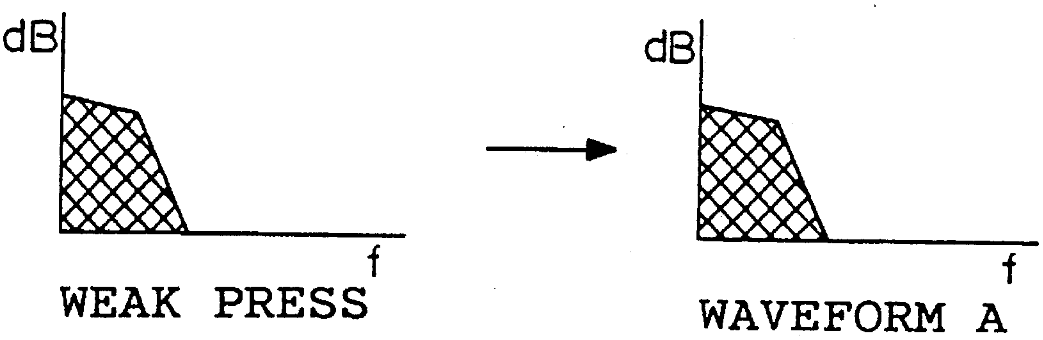
FIGS. 2A and 2B are explanatory views showing the system for storing waveform data in the embodiment.

In the weak press data memory 21*a*, weak press waveform forming data is stored. First, when actual grand piano keys are pressed with a weak touch, resulting sound waveform is sampled. As shown in FIG. 2A, the sampled sound waveform is passed through a low pass filter, thereby forming the waveform only composed of low order harmonic components. The waveform is transformed to data in the pulse code modulation system for the storage into the weak press data memory 21*a*.

Figure 2B:
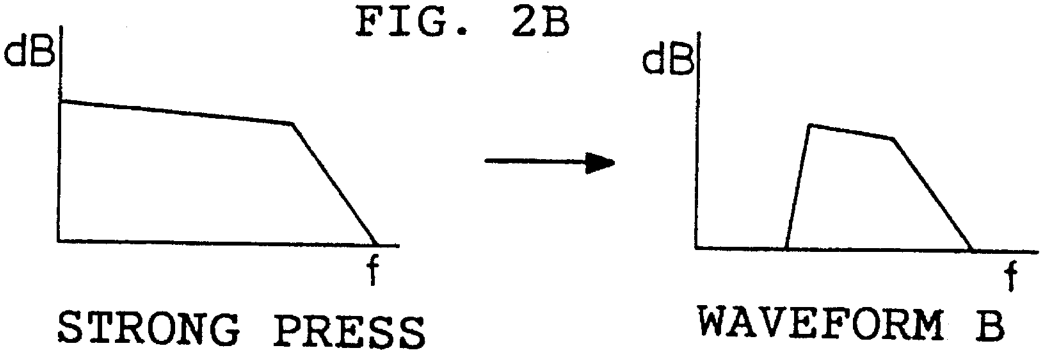

In the strong press data memory 21*b*, strong press waveform forming data is stored. First, when actual grand piano keys are pressed with a strong touch, resulting sound waveform is sampled. As shown in FIG. 2B, the sampled sound waveform is passed through a high pass filter, thereby removing the low order harmonic components from the sampled sound waveform and forming the waveform only composed of remained high order harmonic components. The waveform is transformed to data in the pulse code modulation system for the storage into the strong press data memory 21*b*. The frequency components which can pass through the low pass filter are removed by the high pass filter.

In the impact data memory 21*c*, impact waveform extraction data is stored. Specifically, the impact sound components are extracted from the sound waveform resulting from the pressed keys on the actual grand piano and stored into the impact data memory 21*c*. One piece of such impact information for all the keys is sufficient, because the keys have almost the same impact components. The impact waveform extraction data is preferably stored for at least some sound ranges. The weight of hammers subtlely differs with the sound ranges. By using the impact data memory 21*c*, the subtlely varying impact sounds can be reproduced. In the embodiment, the results of the sampling for each sound range are stored in the impact data memory 21*c*.

Turning back to FIG. 1, the envelope waveform memory 23 is provided with a weak press data memory 23*a*, a strong press data memory 23*b* and an impact data memory 23*c*. In the weak press data memory 23*a*, weak press envelopes are stored. Specifically, the variation with time of sounds levels resulting from the weakly pressed keys of the actual grand piano is sampled for the storage. In the strong press data memory 23*b*, strong press envelopes are stored. Specifically, the variation with time of sound levels resulting from the strongly pressed keys of the actual grand piano is sampled for the storage. In the impact data memory 23*c*, impact envelopes are stored. Specifically, the variation with time of impact sound levels is sampled for the storage.

The sound signal generator 13 is provided with a weak press component sound signal generator 13*a*, a strong press component sound signal generator 13*b*, and impact component sound signal generator 13*c* and an adder 13*d*. The arithmetic addition of the sound signals generated from these generators 13*a*, 13*b* and 13*c* are performed in an optional rate by the adder 13*d*.

Figure 3:
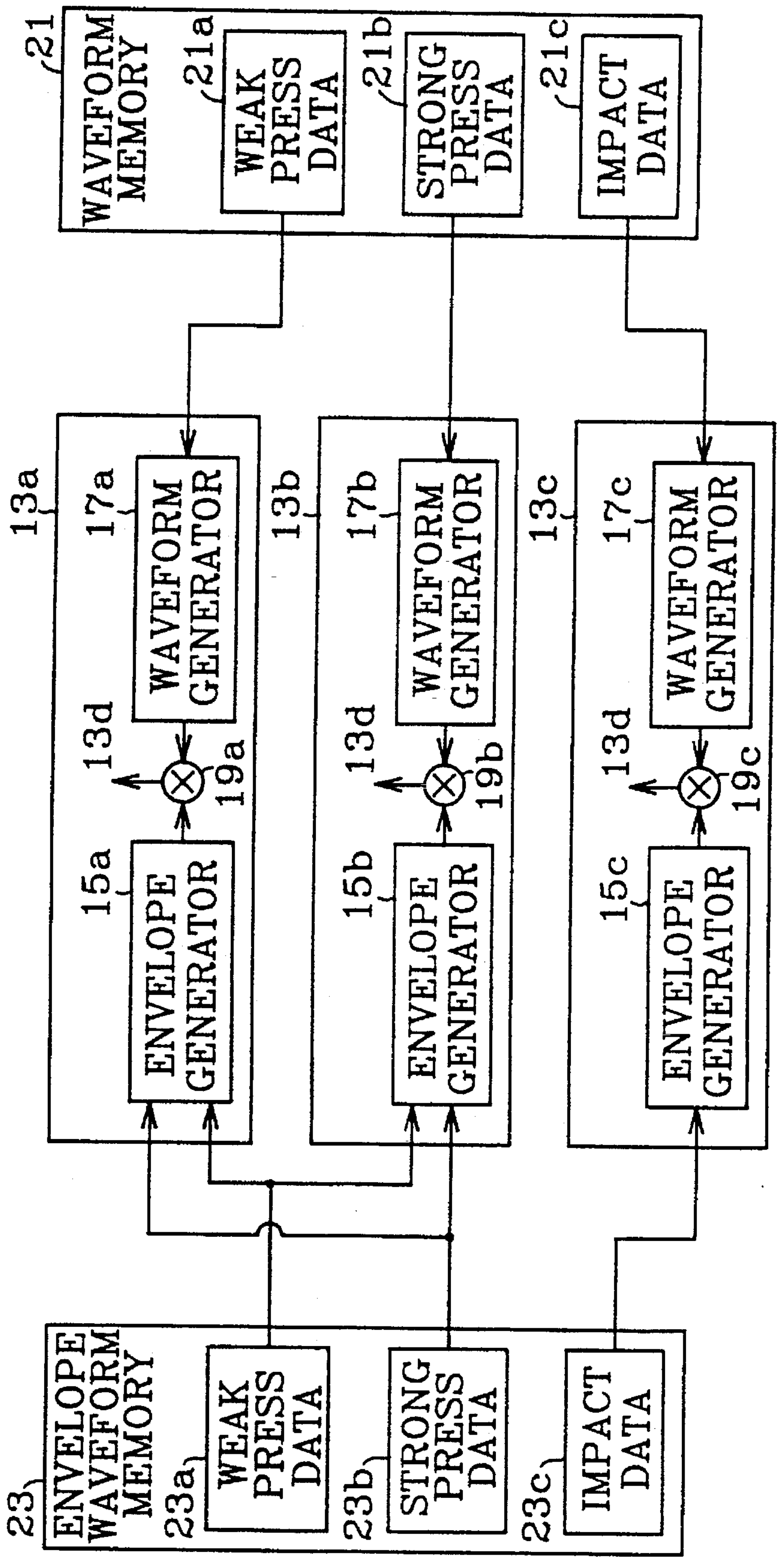
FIG. 3 is a block diagram showing an instrumental sound signal generating system in the embodiment.

As shown in FIG. 3, the weak press, strong press and impact component sound signal generators 13*a*, 13*b* and 13*c* are provided with envelope generators 15*a*, 15*b* and 15*c*, waveform generators 17*a*, 17*b* and 17*c*, and multipliers 19*a*, 19*b* and 19*c*, respectively. The envelopes are determined by the envelope generators 15*a*–15*c* connected to the envelope waveform memory 23. The waveform data corresponding to key numbers are read by the waveform generators 17*a*–17*c* connected to the waveform memory 21. The envelopes determined by the envelope generators 15*a*–15*c* and the waveform data read by the waveform generators 17*a*–17*c* are multiplied each other in the multipliers 19*a*–19*c*.

By the envelope generator 15*a* of the weak press signal generator 13*a*, the weak and strong press envelopes are read from the weak press data memory 23*a* and the strong press data memory 23*b* of the envelope waveform memory 23, respectively, corresponding to the key numbers detected by the keyboard 3. By interpolating the weak and strong press envelopes, the interpolation envelopes representing variations of sound levels with key touches are determined by the envelope generator 15*a*. By the waveform generator 17*a*, the weak press waveform forming data of the detected key number is read from the weak press data memory 21*a* of the waveform memory 21. The interpolation envelopes are multiplied by the weak press waveform forming data in the multiplier 19*a*, thereby generating the sound signals of weak press components.

Similarly, by the envelope generator 15*b* of the strong press signal generator 13*b*, the interpolation envelopes corresponding to key touches are formed. By the waveform generator 17*b*, the strong press waveform forming data of the detected key number is read from the strong press data memory 21*b* of the waveform memory 21, thereby determining the strong press component waveforms. The interpolation envelopes are multiplied by the strong press waveform forming data in the multiplier 19*b*, thereby generating the sound signals of strong press components.

By the envelope generator 15*c* of the impact signal generator 13*c*, the impact envelopes are read from the impact data memory 23*c* of the envelope waveform memory 23, corresponding to the key numbers detected by the keyboard 3. By the waveform generator 17*c*, the impact waveform extraction data of the detected key number is read from the impact data memory 21*c* of the waveform memory 21. The impact envelopes are multiplied by the impact waveform extraction data in the multiplier 19*c*, thereby generating the sound signals of impact components.

In the sound signal generator 13, the aforementioned three kinds of sound signals are added by the adder 13*d*. Thus formed sound signals include low and high order harmonic components and impact components corresponding to key touches and numbers. The sound signals are passed through a digital-to-analog converter 29 and a sound system 31, thereby making sounds.

In the adder 13*d*, the sound signals are not simply added but are processed. Specifically, the sound signals generated by the generators 13*a*–13*c* are multiplied by coefficients such that the sound signals can be mixed in the rate corresponding to key touches before the addition.

In the embodiment the sound signals of strong key press components are multiplied by the coefficient 0 to 1 specified by the key press intensity. For example, when the sounds of weakly pressed keys are reproduced, the sound signals of strong key press components are multiplied by coefficient 0. Consequently, just by adding the sound signals of weak press components and those of impact components, the sounds of weakly pressed keys can be reproduced. The reproduced sound waveform signals contain the harmonic components in the same rate as the signals of the actually weakly pressed keys. The sounds closely similar to the real soft sounds can be reproduced. When the sounds of strongly pressed keys are reproduced, the sound signals of strong key press components are multiplied by coefficient 1. Consequently, the sounds sufficiently containing the strong press components can be reproduced. Furthermore, when the sounds of moderately pressed keys are reproduced, coefficient k to be multiplied by the sound signals of strong key press components is determined with the key press intensity, in which $0<k<1$. Therefore, the sound waveform signals with the high order harmonic components as the strong press components appropriately mixed therein can be formed corresponding to the key press intensity.

The electronic piano 1 of the embodiment can reproduce the sounds of the instruments other than a piano, such as a harpsichord and a pipe organ. The weak press waveform forming data, the strong press waveform forming data and the impact waveform extraction data of the other instruments are stored in the waveform memory 21 and the envelope waveform memory 23 in the same way as those of piano sounds.

Figure 4:
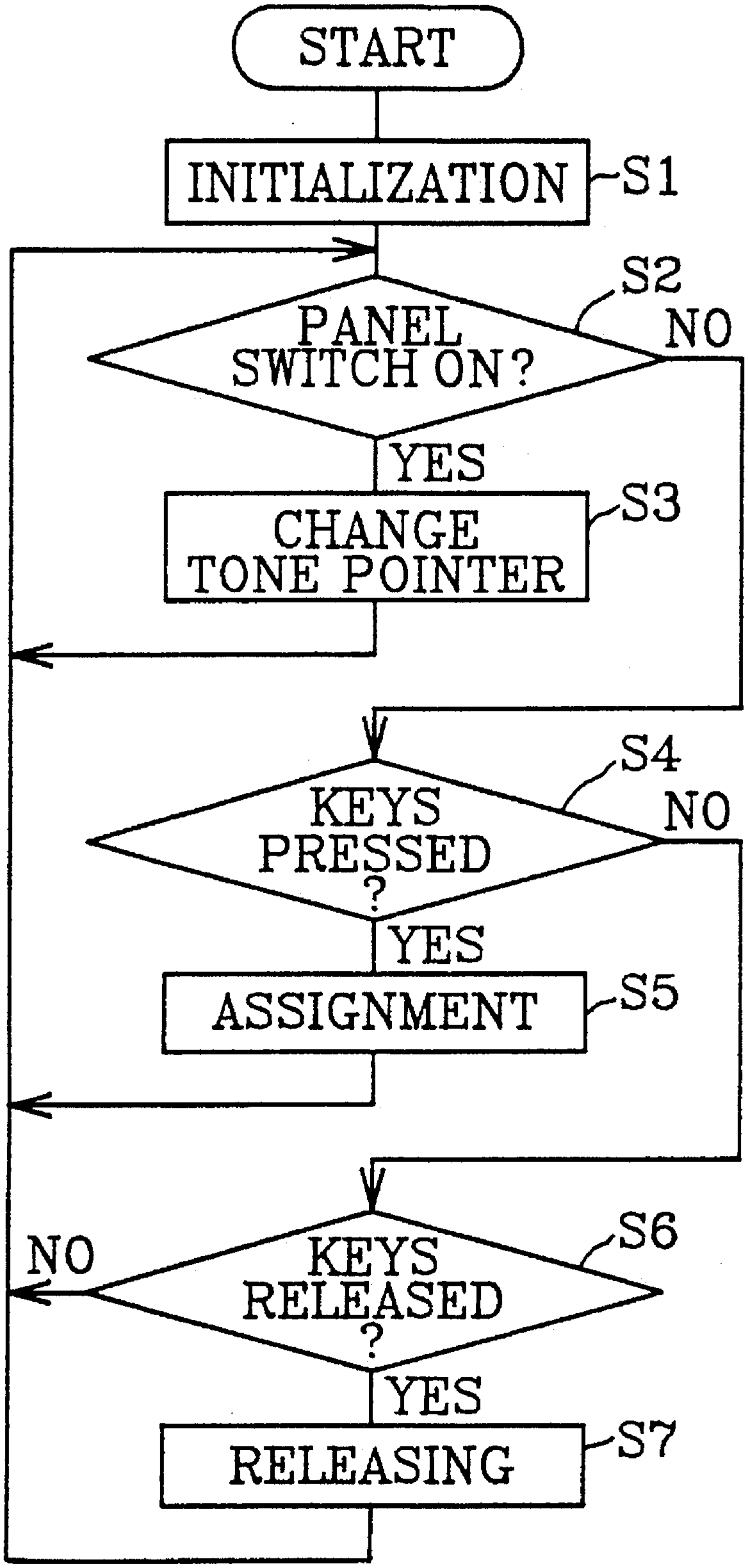
FIG. 4 is a flowchart showing the main routine in the embodiment.

As shown in the flowchart of FIG. 4, the instrumental performance of the electronic piano 1 having the aforementioned structure of the embodiment is controlled.

When the electric power switch of the panel 5 is turned on, at step S1 the initialization is executed. At the step of initialization, the registers of CPU 7 and the registers defined in RAM 11 are initialized and the specified data stored in ROM 9 is transferred to RAM 11. Tone pointers are initialized. Furthermore, piano tone, harpsichord tone, pipe organ tone or other initial tone is determined. Normally in the electronic piano, the piano tone is determined as initial.

It is determined at step S2 whether or not the panel switch for changing tones provided on the panel 5 is turned on. It the answer to step S2 is affirmative, at step S3 the tone pointer is changed in response to the operation of the panel switch. Specifically, when either of the tone selection switches provided on the panel of the electronic piano is turned on, the grand piano tone, harpsichord tone, pipe organ tone or other tone is set.

Subsequently, it is determined at step S4 whether or not the keys of the keyboard 3 are pressed. If the answer to step S4 is affirmative, at step S5 assignment is carried out. The number of generators 13 is equivalent to the number of tones polyphonically produced in the electronic piano 1. The generator 13 is provided in each channel. At the step of assignment, the generator to be used for forming sound signals is assigned according to the status of channel vacancy. The generator 13 of the vacant channel is assigned. To the assigned generator 13 or other are transferred the tone set on the panel 5 as well as the key touch, key number or other data detected by the touch sensor of the keyboard 3. In response to the pressed keys, an instruction is given such that sound signals are formed.

If the answer to step S4 is negative, it is determined at step S6 whether or not keys are released. If the answer to step S6 is affirmative, at step S7 of releasing, the specified release data is sent to the envelope generator 15*a*, 15*b* or 15*c* corresponding to the key number of the released key, so that envelopes are promptly converged to zero, thereby stopping sounds.

Figure 5:
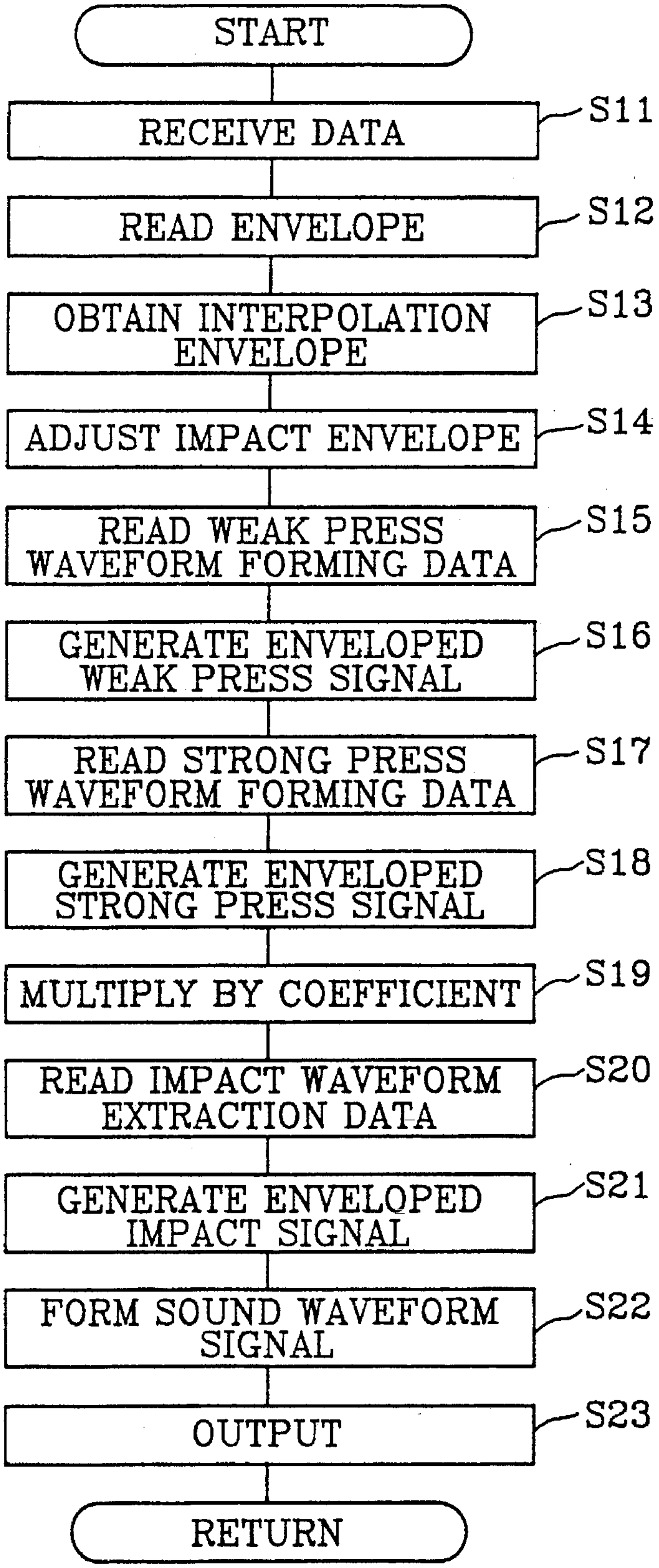
FIG. 5 is a flowchart showing an instrumental sound forming routine in the embodiment.

The process steps of the assigned generator 13*a*, 13*b* or 13*c* and the adder 13*d* are now explained in detail referring to the flowchart of FIG. 5.

First, at step S11 the set or detected data of tones, key numbers and key touches are received. Responsive to the set or detected tone and key number data, at step S12, the weak press envelope, the strong press envelope and the impact envelope are read from the envelope waveform memory 23. Subsequently, at step S13 the interpolation envelope is obtained by interpolating the weak press envelope waveforms and the strong press envelope waveforms of the set or detected key touch data. When the keys are pressed with a weak touch, the interpolation envelope is equivalent to the weak press envelope. When the keys are pressed with a strong touch, the interpolation envelope is equivalent to the strong press envelope. At step S14 the attack level of the impact envelope is adjusted to the key touch data.

Subsequently, at step S15 the weak press waveform forming data complying with the key number data is read from the weak press data memory 21*a* of the waveform memory 21. At step S16, by multiplying the weak press waveform forming data by the interpolation envelope obtained at step S13, the enveloped weak press signal is generated. Similarly, at step S17, the strong press waveform forming data complying with the key number data is read from the strong press data memory 21*b* of the waveform memory 21. At step S18, by multiplying the strong press waveform forming data by the interpolation envelope obtained at step S13, the enveloped strong press signal is generated. Furthermore, at step S19 the enveloped strong press signal resulting from step S18 is multiplied by coefficient k, between zero and one, determined by the key touch data. At step S20 the impact waveform extraction data complying with the key number data is read from the impact data memory 21*c* of the waveform memory 21. At step S21, by multiplying the impact waveform extraction data by the waveform of the impact envelope adjusted at step S14, the enveloped impact signal is generated.

At step S22, by adding the weak press signal, strong press signal and impact signal resulting from steps S16, S19, S21, respectively, the sound waveform signal with harmonic and impact components mixed in a specified rate therein is formed at step S22. The output of the formed sound waveform signal is transmitted to the digital-to-analog converter 29.

Figure 6:
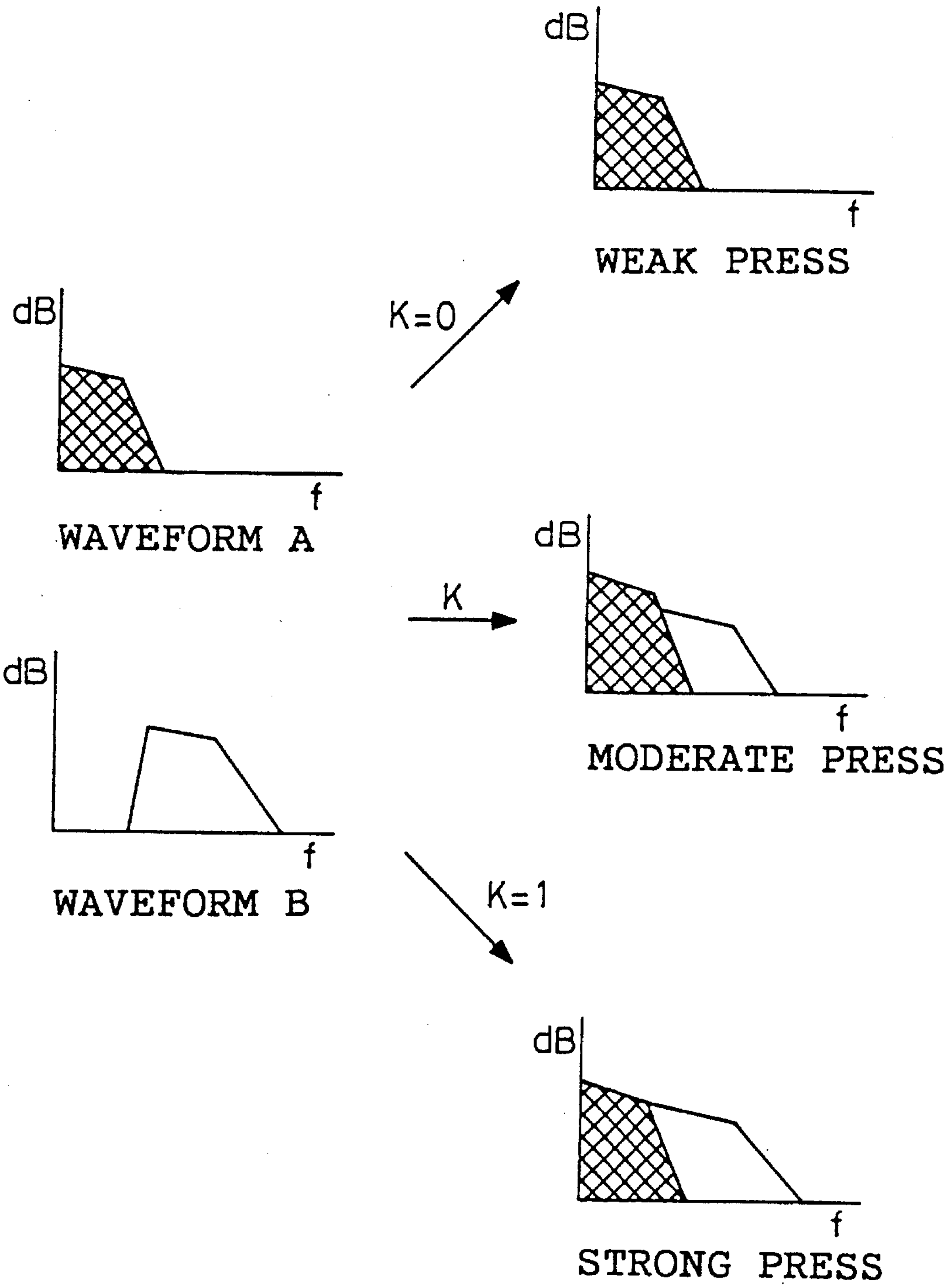
FIG. 6 is an explanatory view showing the synthesizing of weak and strong key press data in the embodiment.
Figure 7:
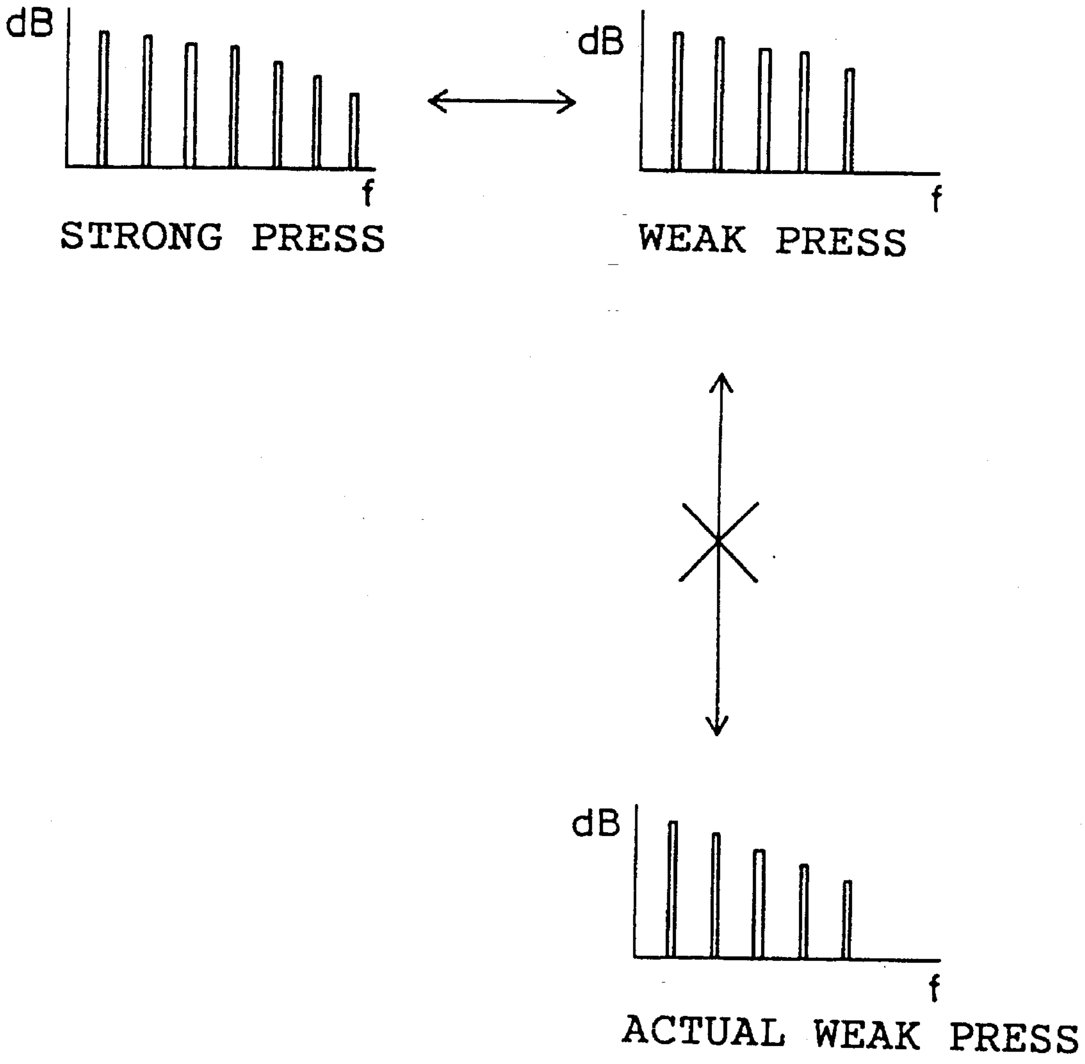
FIGS. 7 and 8 are explanatory views of the conventional sound source system.
Figure 8:
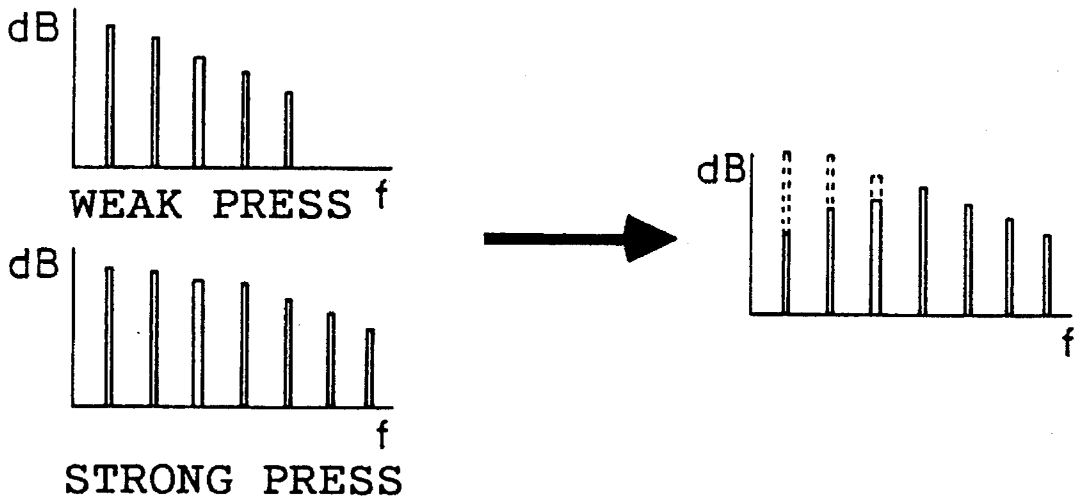

As aforementioned in the embodiment the weak press waveform forming data, composed mainly of the low order harmonic components contained in the sound waveform sampled from the weakly pressed keys, is stored. Also, stored is the strong press waveform forming data composed mainly of the high order harmonic components contained in the sound waveform sampled from the strongly pressed keys. As shown in FIG. 6, by mixing the stored waveform forming data in the rate specified by the key touch data, the sound waveform signal containing the harmonic components in a specified rate can be formed.

Especially, when the sound waveform signal for reproducing sounds of weakly pressed keys is generated, the weak press is used, and the reproduced sound can contain the harmonic components in the rate peculiar to the actual sound of weakly pressed keys. Consequently, almost the actual tone can be reproduced, different from the conventional electronic piano in which the sound signals sampled from strongly pressed keys are passed through the low pass filter to obtain the sound signals of weakly pressed keys.

In the embodiment, the generated sound waveform signal for reproducing sounds of strongly pressed keys sufficiently includes the strong press data. Although the content rate of the low order harmonic components is slightly different from that in the actual loud sound, the rate is well balanced as a whole. Therefore, almost the actual instrumental tone of strongly pressed keys can be reproduced.

The sound waveform signal of moderately pressed keys is formed by mixing the low order harmonic components as the weak press data with the high order harmonic components as the strong press data in a specified rate. The weak press data and the strong press data are processed appropriately so that they fail to interfere with each other in frequency components. Therefore, although these data slightly differ in phase from each other, no phase interference arises. In the embodiment, the data sampled from weakly pressed keys is mixed with the data sampled from strongly pressed keys. Although two kinds of data are used, no phase interference arises. Almost the actual instrumental tone of moderately pressed keys can be reproduced.

Consequently, in the embodiment, the actual instrumental tones of the keys pressed with various touches can be accurately reproduced, while the quantity of data required for such reproduction can be minimized.

This invention has been described above with reference to the preferred embodiment as shown in the FIGURE. Modifications and alterations may become apparent to one skilled in the art upon reading and understanding the specification. Despite the use of the embodiment for illustration purposes, the invention is intended to include all such modifications and alterations within the spirit and scope of the appended claims.

In this spirit, the data to be stored is not limited to the high and low order harmonic components. Other data can be stored, if almost the actual instrumental deep sounds can be reproduced with subtle variations in tones.

When the electronic sounds are made using the data sampled from actual instrumental sounds, the sounds of the keys pressed with various intensities are sampled and processed into data having the appropriate range of frequencies, such that the data do not interfere in phase one another. The data is not limited to the low and high order harmonic components as aforementioned.

The electronic sounds made in the invention can have the sounding level variable with key touches and also have the tones variable with key touches. Thus, tasteful sounds can be enjoyed.

What is claimed is:

1. A sound source system comprising:

a first storage means for storing a waveform of a predetermined first frequency range composing a sound that is generated at with a first intensity;

a second storage means for storing a second waveform of a predetermined second frequency range composing a sound that is generated at a second intensity, said second frequency range being of different frequency than said first frequency range stored in said first storage means; and a synthesizing means for synthesizing data stored in said first and second storage means, when an intensity of a sound to be reproduced is specified, at a rate corresponding to the intensity of the sound to be reproduced, thereby forming a musical signal.

2. A sound source system according to claim 1, wherein said synthesizing means synthesizes low order harmonic components read from said first storage means when the given sound intensity is weak, and synthesizes high order harmonic components read from said second storage means when the given sound intensity is strong.

3. An electronic instrument, comprising:

a first waveform storage means for storing a first waveform component having a specified first range of frequencies, said first waveform component resulting from the waveform sampled from each of multiple sounds made at a first intensity;

a second waveform storage means for storing a second waveform component having a specified second range of frequencies, said second range of frequencies being at different frequencies than said first range of frequencies, said second waveform component resulting from the waveform sampled from each of multiple sounds made with a second intensity;

a synthesizing means for reading waveform components from said first waveform storage means and said second waveform storage means, corresponding to a pitch of sound when the pitch and the intensity of the sound to be generated are given, and synthesizing said waveform components at a rate corresponding to the intensity of the sound to be reproduced; and an output means for generating sound based upon the waveform components synthesized by said synthesizing means.

4. An electronic instrument according to claim 3, wherein said first waveform storage means stores low order harmonic components and said second waveform storage means stores high order harmonic components.

5. An electronic instrument according to claim 4, wherein said synthesizing means synthesizes the low order harmonic components read from said first waveform storage means when the given sound intensity is weak, and synthesizes the high order harmonic components read from said second waveform storage means when the given sound intensity is strong.

6. An electronic instrument according to claim 4, wherein the low order harmonic components stored in said first waveform storage means is formed by sampling the waveform from the sound of weakly depressed keys and passing the waveform through a low pass filter, and the high order harmonic components stored in said second waveform storage means is formed by sampling the waveform from the sound of strongly depressed keys and passing the waveform through a high pass filter.

7. An electronic piano, comprising;

a keyboard having multiple keys for generating sound;

a first waveform storage means for storing a first waveform component of a specified first range of frequencies, said first waveform component resulting from the waveform sampled from each piano sound made with a first relatively soft key depression;

a second waveform storage means for storing a second waveform component of a specified second range of frequencies, said second range of frequencies being of different frequencies than said first range of frequencies, said second waveform component resulting from the waveform sampled from each piano sound generated with a second relatively strong key depression;

a synthesizing means for reading waveform components from said first waveform storage means and said second waveform storage means, corresponding to a pitch of sound when the pitch and intensity of sound to be generated are given, synthesizing low order harmonic components read from said first waveform storage means when the given sound intensity is weak, and synthesizing high order harmonic components read from said second waveform storage means when the given sound intensity is strong; and an output means for generating sound based on the waveform components synthesized by said synthesizing means.

* * * * *